3,435,067
PROCESS FOR PREPARING HIGH PURITY BIS(β-HYDROXYETHYL) TEREPHTHALATE

Michitoshi Kitabatake, Masatomo Ito, Takashi Ikeda, Noriyoshi Aozuka, and Yoshitaka Noguchi, Tokyo, Japan, assignors to Showa Denko Kabushiki Kaisha, Tokyo, Japan, a corporation of Japan
No Drawing. Filed July 19, 1966, Ser. No. 566,218
Claims priority, application Japan, July 26, 1965, 40/44,823; Aug. 21, 1965, 40/50,886, 40/50,887; Nov. 17, 1965, 40/70,173
Int. Cl. C07c 69/82
U.S. Cl. 260—475                                    3 Claims

ABSTRACT OF THE DISCLOSURE

A process for preparing high purity bis (β-hydroxyethyl) terephthalate which comprises reacting terephthalonitrile, ethylene glycol and water in the presence of a reaction accelerating catalyst selected from the group consisting of oxides and salts of zinc, cadmium, lead, magnesium, cobalt and nickel, the improvement which comprises adding a color inhibiting agent selected from the group consisting of thallium (I) carbonate, thallium (I) chloride, indium (III) oxide, indium (III) chloride, aluminum chloride, tin (II) chloride, antimony (III) chloride, bismuth (III) chloride, magnesium, zinc, aluminum, tin, lead and bismuth. Bis (β-hydroxyethyl terephthalate is useful as an intermediate for the production of films and fibers.

---

This invention relates to a process for preparing high purity bis(β-hydroxyethyl) terephthalate by reacting terephthalonitrile, ethylene glycol and water.

Bis(β-hydroxyethyl) terephthalate is important as an intermediate for the production of polyethylene terephthalate which is commercially of immense values as fibers and films. While the process of directly esterifying terephthalic acid with either ethylene glycol or ethylene oxide and the process in which dimethyl terephthalate is transesterified with ethylene glycol are known as processes by which bis(β-hydroxyethyl) terephthalate is prepared, a process in which terephthalonitrile is esterified with ethylene glycol is recently attracting attention.

The desired bis(β-hydroxyethyl) terephthalate is formed by heating together the three reactant components of terephthalonitrile, ethylene glycol and water, but the reaction is slow. Hence, for accelerating the reaction and increasing the yield, proposals have been made of adding catalysts of various kinds. And of these catalysts, the oxides and salts of zinc, cadmium, lead, manganese, cobalt and nickel are especially outstanding in their reaction accelerating ability. However, when these catalysts which excel in their reaction accelerating ability are used and the reaction of terephthalonitrile with ethylene glycol and water is carried out, the resulting bis(β-hydroxyethyl) terephthalate is in all instances obtained in an impure discolored state. Many complicated operations and much expense are required for purifying this impure bis(β-hydroxyethyl) terephthalate for use in producing polyethylene terephthalate, and particularly polyethylene terephthalate which is to be used in producing textile fibers. In addition, there entails an unexpectedly large amount of loss of the bis(β-hydroxyethyl) terephthalate during the purification process. For instance, it is necessary to carry out a complicated operation entailing much loss, which comprises separating by filtration of removing by centrifuging the crystallized out bis(β-hydroxyethyl) terephthalate after completion of the reaction, then removing a major portion of the discoloration therefrom by repeating the recrystallization from water several times using a large amount of active carbon, followed by recrystallization from an organic solvent such as ethyl acetate.

Consequently, the direct and efficient preparation of substantially colorless high grade bis(β-hydroxyethyl) terephthalate not requiring the uneconomical purification operation was an important problem whose solution has been awaited all along. The present invention has as its object the solution of this problem.

As a result of our researches, we found that substantially colorless good grade bis(β-hydroxyethyl) terephthalate could be obtained in good yield and with a relatively short reaction period by combining a catalyst which has been known or proposed hitherto as being a reaction accelerating catalyst for the preparation of bis (β-hydroxyethyl) terephthalate, and especially those catalysts which have been hereinbefore mentioned as having great reaction accelerating ability, with at least one of the hereinafter given substances—to be referred to herein as "coloration inhibiting agents"—and by applying a specific procedure in their use, as hereinafter described.

The substances to be used as the aforesaid coloration inhibiting agent include thallium carbonate, thallium chloride, indium oxide, indium chloride, aluminum chloride, tin chloride, antimony chloride, bismuth chloride, magnesium, zinc, aluminum, tin, lead and bismuth.

Of these coloration inhibiting agents, it was found that thallium carbonate, thallium chloride, indium oxide and indium chloride had catalytic ability of providing good grade bis(β-hydroxyethyl) terephthalate even when used alone. They however had the drawback that their reaction accelerating ability was not sufficiently great. The present invention has succeeded in the manifestation at the same time of the coloration inhibiting effect by means of these coloration inhibiting agents and the reaction accelerating effect by means of the hitherto-proposed reaction accelerating catalysts. It is however required that the coloration inhibiting agents be used in accordance with a specific procedure to be hereinafter described.

As a result of researchers, we found that by the simple combined use of the aforesaid reaction accelerating catalyst and coloration inhibiting agent the effect of the coloration inhibiting agent could not be fully manifested, though the discoloration was reduced somewhat, and in consequence the desired good grade bis(β-hydroxyethyl) terephthalate could not be obtained. For manifesting the coloration inhibiting effect by means of the aforesaid coloration inhibiting agent, it is necessary that prior to the start of the reaction of the three reactant components of terephthalonitrile, ethylene glycol and water in the presence of the reaction accelerating catalyst, i.e., before the reaction accelerating catalyst and the three reactant components are placed in a coexistent state, the coloration inhibiting agent be mixed and heated together with at least the two components of ethylene glycol and water. Either of the three modes of (a), (b) and (c), as described below, can be employed for carrying out the foregoing procedure.

(a) A coloration inhibiting agent is added to a mixture of the two reactant components of ethylene glycol and water, and the mixture is preheated; after which terephthalonitrile, the other component, and a reaction accelerating catalyst are combined therewith, and then the esterification reaction is carried out.

(b) A coloration inhibiting agent and a reaction accelerating catalyst are added to a mixture of the two reactant components of ethylene glycol and water followed by preheating the thus obtained mixture, the esterification reaction then being carried out after adding terephthalonitrile, the other component.

(c) A mixture of the three reactant components of terephthalonitrile, ethylene glycol and water is incorporated with a coloration inhibiting agent and heated; after which a reaction accelerating catalyst is added, and the esterification reaction is carried out.

Of these three modes of (a), (b) and (c), the aforesaid (a) is the best with respect to the coloration inhibiting effect obtained and is thus to be preferred.

After completion of the reaction, products without substantially any coloration are obtained by carrying out the customary procedures of cooling the reaction mixture to crystallize out the resulting bis($\beta$-hydroxyethyl) terephthalate, which is then recovered.

If the invention is summarized, it is as follows:

In a process for preparing bis($\beta$-hydroxyethyl) terephthalate by reacting the three reactant components of terephthalonitrile, ethylene glycol and water in the presence of a customary reaction accelerating catalyst, particularly at least one member selected from the group consisting of oxides and salts of zinc, cadmium, lead, manganese, cobalt and nickel, the improvement which comprises the steps of: (1) adding as a coloration inhibiting agent at least one member selected from the group consisting of thallium (I) carbonate, thallium (I) chloride, indium (III) oxide, indium (III) chloride, aluminum chloride, tin (II) chloride, antimony (III) chloride, bismuth (III) chloride, magnesium, zinc, aluminum, tin, lead and bismuth, to a mixture consisting of at least the two components of ethylene glycol and water of said three reactant components, and preheating the thus obtained mixture in advance of the time said three reactant components and said reaction accelerating catalyst are placed in a state of co-existence; (2) reacting the whole of the three reactant components including the aforesaid heat treated mixture containing the coloration inhibiting agent by heating said mixture in the presence of said reaction accelerating catalyst; and (3) cooling the reaction mixture and recovering the so crystallized out substantially colorless high purity bis($\beta$-hydroxyethyl) terephthalate.

The reaction accelerating catalysts to be used in this invention are known heretofore as being effective in this reaction and, among them, those metal compounds which have been enumerated hereinbefore are preferred in view of their excellent reaction accelerating effect. As the metallic salts, conveniently used are the weak acid salts such as acetates, and the halides.

On the other hand, of the coloration inhibiting agents, which have been previously specified, generally speaking, the coloration inhibiting effect of the metal compounds is greater than that of the metals. Of these metal compounds, thallium carbonate, indium chloride, indium oxide, antimony chloride and aluminum chloride are especially outstanding in their coloration inhibiting effect.

Although the amounts used of the aforesaid coloration inhibiting agent and reaction accelerating catalyst are not restricted, fully satisfactory results are obtained when they are used on the basis of their respective metal atom in amounts ranging between $2.5 \times 10^{-3}$ and $1.0 \times 10^{-1}$ mol per mol of the terephthalonitrile. And for obtaining a desirable coloration inhibiting effect, a mole ratio of the coloration inhibiting agent to the reaction accelerating catalyst of 0.8–5.0:1 is chosen. A sufficient coloration inhibiting effect is not obtained by the use of the coloration inhibiting agent in amounts below the foregoing limits. On the other hand, the use of the coloration inhibiting agent in amounts exceeding the upper limit indicated above does not give results that are proportional, but there is rather a tendency that the acceleration of the reaction is impeded.

Although no special limitations are imposed as to the temperature and time of the aforesaid step 1, i.e., the step in which the coloration inhibiting agent is added to the reactant components and the mixture is preheated, usually a temperature ranging between 100° C. and 197° C., the boiling point of ethylene glycol, and a time on the order of 10 minutes to 2 hours are used. In general, when the temperature is high a short preheating period is used, whereas when the temperature is low, the period of heating is prolonged. For example, desirable results are obtained by preheating for periods and temperatures on the order of 15 minutes at 190° C. to one hour at 150° C.

As regards the proportion in which the three reactant components to be used in this invention are mixed, the ethylene glycol is used with advantage in a range of 4–40 mols, and preferably 10–30 mols and the water 2–3 mols per mol of the terephthalonitrile.

A reaction temperature of 140–200° C., and preferably 170–190° C. from the standpoint of the reaction velocity, can be employed. On the other hand, the reaction pressure used is usually normal atmospheric pressure, though pressures other than atmospheric such as the pressure of 2 atoms gauge can be used, if necessary. These quantitative ratios of the reactants and the reaction conditions are identical to those which are customarily used.

Thus, a substantially colorless bis($\beta$-hydroxyethyl) terephthalate is obtained according to the process of this invention. And by an operation consisting of merely recrystallizing the so obtained product from water once high purity bis($\beta$-hydroxyethyl) terephthalate suitable for the production polyethylene terephthalate for textile fibers can be obtained.

The following examples are given for further illustrating the invention. By way of comparison, instances not in accordance with the invention process are also given. Unless otherwise indicated, the parts are on a weight basis. Further, TPN, EG and BHET are respectively abbreviations of terephthalonitrile, ethylene glycol and bis($\beta$-hydroxyethyl) terephthalate.

Example 1

A mixture of 200 parts of ethylene glycol, 5.6 parts of water and 1.8 parts of thallium carbonate, the coloration inhibiting agent, was charged to a 3-necked flask equipped with a magnetic stirrer, a gas inlet line, a thermometer and a reflux condenser, and then heated at an internal temperature of 150° C. for one hour. Next, 20 parts of terephthalonitrile and 1.5 parts of lead acetate, the reaction accelerating agent, were placed in the flask and, after purging the inside thereof with nitrogen, the mixture was heated at an internal temperature of 190° C. while passing nitrogen therethrough.

The extent to which the reaction of terephthalonitrile, ethylene glycol and water progressed was determined by the evolvement of ammonia. This ammonia was conducted along with the nitrogen to the outside of the system via the reflux condenser to be absorbed in dilute sulfuric acid. Then by back titration at given intervals with dilute caustic soda aqueous solution, the amount evolved of the ammonia, i.e., the rate of conversion of terephthalonitrile, was measured. With a reaction of 3 hours, ammonia amounting to 95% of theory was evolved. The liquid reaction mixture at the time of the conclusion of the reaction was colorless, and the crystallized out bis($\beta$-hydroxyethyl) terephthalate was also colorless. The melting point of this bis(β-hydroxyethyl) terephathalate was 107–9° C., and when recrystallized from water once, is was 110° C. By polycondensing this bis(β-hydroxyethyl) terephthalate at 275° C. under a vacuum of 1 mm. Hg in the presence of antimony oxide, white polyethylene terephthalate (softening point 259° C.) was obtained.

Control 1

A mixture of 20 parts of terephthalonitrile, 200 parts of ethylene glycol, 5.6 parts of water and 1.5 parts of lead acetate was reacted at an internal temperature of 190° C. in an apparatus as used in Example 1. With a reaction of 3 hours the amount of ammonia evolved was 96% of theory. The color of this reaction mixture was dark brown. Further, the bis(β-hydroxyethyl) terephthalate (M.P. 103–6° C.) crystallized out upon cooling was light brown in color.

Control 2

Twenty parts of terephthalonitrile, 200 parts of ethylene glycol, 5.6 parts of water, 1.8 parts of thallium carbonate and 1.5 parts of lead acetate were mixed and then reacted as in Control 1. Three hours after the start of the reaction, the evolvement of ammonia amounted to 98% of theory, the reaction mixture exhibiting at that time a yellowish brown color. The resulting bis(β-hydroxyethyl) terephthalate had a melting point of 101–105° C. and was light brown in color.

Examples 2–20 and Controls 3–11

Results of Examples 2–20 which were carried out according to the invention process and those of Controls 3–11 which were carried out for purpose of comparison are shown summarized in the following Tables (A) and (B). In the Table (A) conditions of preheat treatment and esterification reaction are shown, and in Table (B) corresponding results obtained and colorations by polymerization test are shown.

In the Table (A), the refrence characters a, b and c which indicate the modes of practice correspond to the three modes of practicing the invention process, which were hereinbefore described; namely:

(a) A coloration inhibiting agent is added to a mixture of the two reactant components of ethylene glycol and water, and the mixture is preheated; after which terephthalonitrile and a reaction accelerating catalyst are combined therewith, and then the esterification reaction is carried out.

(b) A coloration inhibiting agent and a reaction accelerating agent are added to a mixture of the two reactant components of ethylene glycol and water, and the thus obtained mixture is preheated, after which terephthalonitrile is added, and the esterification reaction is carried out.

(c) A coloration inhibiting agent is added to a mixture of the three reactant components of terephthalonitrile, ethylene glycol and water, and the thus obtained mixture is preheated, after which a reaction accelerating catalyst is added, and the esterification reaction is carried out.

The controls were carried out for affording comparisons with the respective examples which are given in the directly preceding line in the table, and were experiments which were not carried out according to the process of this invention. Controls 5 and 9 were experiments in which a mixture of the three reactant components was preheated without the addition of coloration inhibiting agent and reaction accelerating catalyst, following which the esterification reaction was carried out adding only a reaction accelerating catalyst. On the other hand, Control 7 was an experiment in which a coloration inhibiting agent and a reaction accelerating catalyst were added together in a mixture of the three reactant components from the first in carrying out the esterification reaction.

TABLE (A)

| Example No. | Mode of practice | Preheat Treatment | | | | | | | Esterification Reaction | | | | |
|---|---|---|---|---|---|---|---|---|---|---|---|---|---|
| | | Ethylene glycol, parts | Water, parts | Terephthalonitrile, parts | Coloration inhibiting agent, parts | Reaction accelerating catalyst, parts | Treatment temperature, °C. | Treatment time, min. | Added component, parts | Reaction accelerating catalyst, parts | Reaction temperature, °C. | Reaction time, hr. | Conversion, percent |
| 2 | a | 200 | 5.6 | | | Tl₂CO₃, 1.8 | | 150 | 60 | T.P.N., 20 | Co(OAc)₂, 0.4 | 190 | 5 | 90 |
| Control 3 | | | | | | | | | | T.P.N., 20; E.G., 200; H₂O, 5.6 | Co(OAc)₂, 0.4 | 190 | 5 | 94 |
| 3 | a | 200 | 5.6 | | | Tl₂CO₃, 1.8 | | 190 | 15 | T.P.N., 20 | Cd(OAc)₂, 1.0 | 190 | 3 | 89 |
| Control 4 | | | | | | | | | | T.P.N., 20; E.G., 200; H₂O, 5.6 | Cd(OAc)₂, 1.0 | 190 | 3 | 97 |
| Control 5 | | 200 | 5.6 | 20 | | | | 180 | 240 | | Cd(OAc)₂, 1.0 | 180 | 1.5 | 92 |
| 4 | c | 200 | 5.6 | 20 | Tl₂CO₃, 1.8 | | | 180 | 120 | | Cd(OAc)₂, 1.0 | 180 | 3 | 86 |
| 5 | b | 200 | 5.6 | | Tl₂CO₃, 1.8 | Cd(OAc)₂, 1.0 | | 150 | 60 | T.P.N., 20 | | 190 | 3 | 87 |
| 6 | b | 620 | 18 | | Tl₂CO₃, 4.7 | | | 150 | 60 | T.P.N., 64 | PbCl₂, 2.8 | 190 | 5 | 95 |
| 7 | a | 200 | 5.6 | | | SnCl₂, 0.9 | | 150 | 60 | T.P.N., 20 | Pb(OAc)₂, 1.5 | 190 | 3 | 93 |
| Control 6 | | | | | | | | | | T.P.N., 20; E.G., 200; H₂O, 5.6 | Pb(OAc)₂, 1.5 | 190 | 3 | 96 |
| Control 7 | | | | | | | | | | T.P.N., 20; E.G., 200; H₂O, 5.6 | SnCl₂, 0.9; Pb(OAc)₂, 1.5 | 190 | 3 | 94 |
| 8 | a | 200 | 5.6 | | | SbCl₃, 0.5 | | 150 | 60 | T.P.N., 20 | Co(OAc)₂, 0.4 | 190 | 5 | 96 |
| Control 8 | | | | | | | | | | T.P.N., 20; E.G., 200; H₂O, 5.6 | Co(OAc)₂, 0.4 | 190 | 5 | 94 |
| Control 9 | | 200 | 5.6 | 20 | | | | 180 | 240 | | Cd(OAc)₂, 1.0 | 180 | 1.5 | 92 |
| 9 | c | 200 | 5.6 | 20 | BiCl₃, 1.2 | | | 180 | 120 | | Cd(OAc)₂, 1.0 | 180 | 3 | 91 |
| 10 | b | 200 | 5.6 | | SnCl₂, 0.9 | Cd(OAc)₂, 1.0 | | 150 | 120 | T.P.N., 20 | | 190 | 3 | 90 |
| 11 | a | 200 | 5.6 | | TlCl, 0.67 | | | 150 | 60 | T.P.N., 20 | | 190 | 3 | 88 |
| Control 10 | | 250 | 7.5 | | | | | 150 | 60 | T.P.N., 20 | Zn(OAc)₂, 0.4 | 190 | 5 | 86 |
| 12 | a | 250 | 7.5 | | InCl₃, 0.5 | | | 150 | 60 | T.P.N., 20 | Zn(OAc)₂, 0.4 | 190 | 5 | 92 |
| 13 | a | 250 | 7.5 | | In₂O₃, 0.35 | | | 150 | 60 | T.P.N., 26 | Cd(OAc)₂, 0.53 | 185 | 6 | 95 |
| 14 | a | 200 | 5.6 | | AlCl₃, 1.2 | | | 160 | 30 | T.P.N., 26 | Cd(OAc)₂, 0.55 | 185 | 6 | 93 |
| 15 | a | 200 | 5.6 | | Zn, 0.3 | | | 150 | 60 | T.P.N., 26 | Pb(OAc)₂, 1.9 | 185 | 3 | 92 |
| Control 11 | | | | | | | | | | T.P.N., 20; E.G., 200; H₂O, 5.6 | Pb(OAc)₂, 1.5; Zn, 0.3 | 190 | 3 | 98 |
| 16 | a | 200 | 5.6 | | Sn, 0.5 | | | 150 | 60 | T.P.N., 20 | Co(OAc)₂, 0.4 | 190 | 5 | 91 |
| 17 | a | 200 | 5.6 | | Pb, 0.8 | | | 150 | 60 | T.P.N., 20 | Ni(OAc)₂, 1.0 | 190 | 3 | 90 |
| 18 | a | 200 | 5.6 | | Al, 0.2 | | | 190 | 15 | T.P.N., 20 | Mn(OAc)₂, 1.0 | 190 | 3 | 88 |
| 19 | a | 200 | 5.6 | | Bi, 0.8 | | | 150 | 60 | T.P.N., 20 | Cd(OAc)₂, 1.0 | 190 | 4 | 94 |
| 20 | a | 200 | 5.6 | | Mg, 0.2 | | | 150 | 60 | T.P.N., 20 | Zn(OAc)₂, 0.4 | 190 | 5 | 84 |

TABLE (B)

| Example No. | Results obtained | | | Polymerization test—Coloration of polyester |
|---|---|---|---|---|
| | Color of reactant liquid | Deposited crystal (color of BHET) | Melting point of BHET crystal | |
| 2 | Slight red | Colorless | 107-9 | Colorless. |
| Control 3 | Deep red | Light reddish brown | 104-6 | Blackish brown. |
| 3 | Light yellow | Pale yellow | 108 | Slight yellow. |
| Control 4 | Dark reddish brown | Brown | 104-7 | Blackish brown. |
| Control 5 | do | do | 102-5 | Brown. |
| 4 | Extremely light yellow | Colorless | 106-7 | Slight yellow. |
| 5 | Brown | Brown | 103-7 | Brown. |
| 6 | Colorless | Colorless | 107-9 | White, softening point 259° C. |
| 7 | do | do | 109-10 | Do. |
| Control 6 | Dark brown | Light brown | 103-6 | Brown. |
| Control 7 | Yellowish brown | Light yellow | 103-5 | Light brown. |
| 8 | Light pink | Colorless | 109 | White. |
| Control 8 | Deep red | Light reddish brown | 104-6 | Blackish brown. |
| Control 9 | Dark reddish brown | Brown | 102-5 | Brown. |
| 9 | Light yellow | Colorless | 106-8 | Slight yellow. |
| 10 | do | Light yellow | 105-8 | Light yellow. |
| 11 | Colorless | Colorless | 107-9 | Colorless. |
| Control 10 | Brown | Light brown | 104-6 | Brown. |
| 12 | Slight yellow | Slight yellow | 106-8 | Slight yellow. |
| 13 | Pale yellow | do | 108 | Light yellow. |
| 14 | Colorless | Colorless | 107-9 | Colorless. |
| 15 | do | do | 107-9 | Do. |
| Control 11 | Dark brown | Light yellowish brown | 103-5 | Brown. |
| 16 | Slight yellow | Colorless | 107-9 | Slight yellow. |
| 17 | Light brown | Slight brown | 106-8 | Do. |
| 18 | Light yellow | Colorless | 108 | Do. |
| 19 | do | do | 106-7 | Colorless. |
| 20 | Colorless | do | 107-9 | Do. |

We claim:

1. In a process for preparing bis($\beta$-hydroxyethyl) terephthalate by reacting the three reactant components of terephthalonitrile, ethylene glycol and water in the presence, as a reaction accelerating catalyst, of at least one member selected from the group consisting of oxides and salts of zinc, cadmium, lead, manganese, cobalt and nickel, the improvement which comprises the steps of:

(1) adding as a coloration inhibiting agent at least one member selected from the group consisting of thallium (I) carbonate, thallium (I) chloride, indium (III) oxide, indium (III) chloride, aluminum chloride, tin (II) chloride, antimony (III) chloride, bismuth (III) chloride, magnesium, zinc, aluminum, tin, lead and bismuth, to a mixture consisting of at least the two components of ethylene glycol and water of said three reactant components, and preheating the thus obtained mixture in advance of the time said three reactant components and said reaction accelerating catalyst are placed in a state of coexistence;

(2) reacting the whole of the three reactant components including the aforesaid heat treated mixture containing the coloration inhibiting agent by heating said mixture in the presence of said reaction accelerating catalyst; and (3) cooling the reaction mixture and recovering the so crystallized out substantially colorless high purity bis($\beta$-hydroxyethyl) terephthalate.

2. The process according to claim 1 wherein the preheating treatment of step (1) is effected for 10 minutes to 2 hours at a temperature 100°–197° C.

3. The process according to claim 1 wherein said reaction accelerating catalyst and said coloration inhibiting agent are used on the basis of their respective metal atom in amounts ranging between $2.5 \times 10^{-3}$ and $1.0 \times 10^{-1}$ mol per mole of the terephthalate, and the mole ratio of the coloration inhibiting agent to the reaction accelerating catalyst is 0.8–5:1.

References Cited

UNITED STATES PATENTS 3,313,844   4/1967   Matsuhisa et al. ---- 260—475

JAMES A. PATTEN, *Primary Examiner.*

E. J. SKELLY, *Assistant Examiner.*